(No Model.)

E. DECOLLOGNE.
FEED REGULATOR.

No. 428,768. Patented May 27, 1890.

Witnesses:
H. B. Kingsbery
O. C. Northup

Inventor:
Eugene Decollogne,
by William E. Soulter,
atty.

UNITED STATES PATENT OFFICE.

EUGENE DECOLLOGNE, OF PARIS, FRANCE.

FEED-REGULATOR.

SPECIFICATION forming part of Letters Patent No. 428,768, dated May 27, 1890.

Application filed February 18, 1890. Serial No. 340,973. (No model.) Patented in England December 19, 1889, No. 20,455.

*To all whom it may concern:*

Be it known that I, EUGENE DECOLLOGNE, a citizen of the Republic of France, residing at Paris, in France, have invented certain new and useful Improvements in Feed-Regulators, (for which I have applied for Letters Patent of Great Britain, No. 20,455, dated December 19, 1889,) of which the following is a specification.

This invention relates to a mechanical arrangement for the automatic distribution of farinaceous, soft, and also very light substances—such as corn-flour, oatmeal, and the like substances. By this contrivance the substances are distributed in a regular manner and without causing an obstruction or stoppage in the distributing parts.

The accompanying drawings clearly illustrate the arrangement of the different parts of a distributer constructed according to this invention, and in said drawings—

Figure 1:
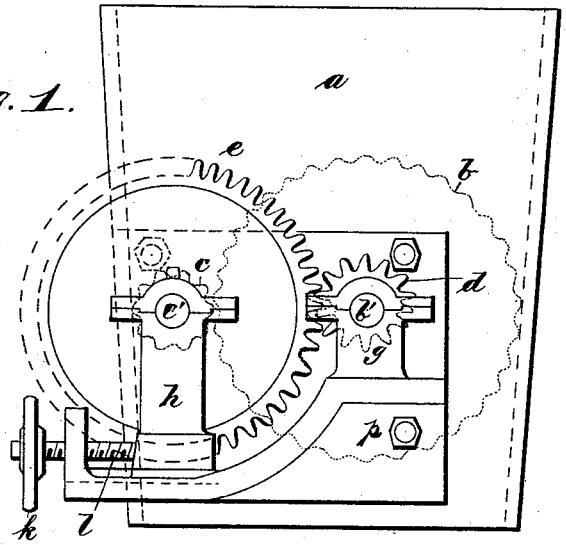
Figure 2:
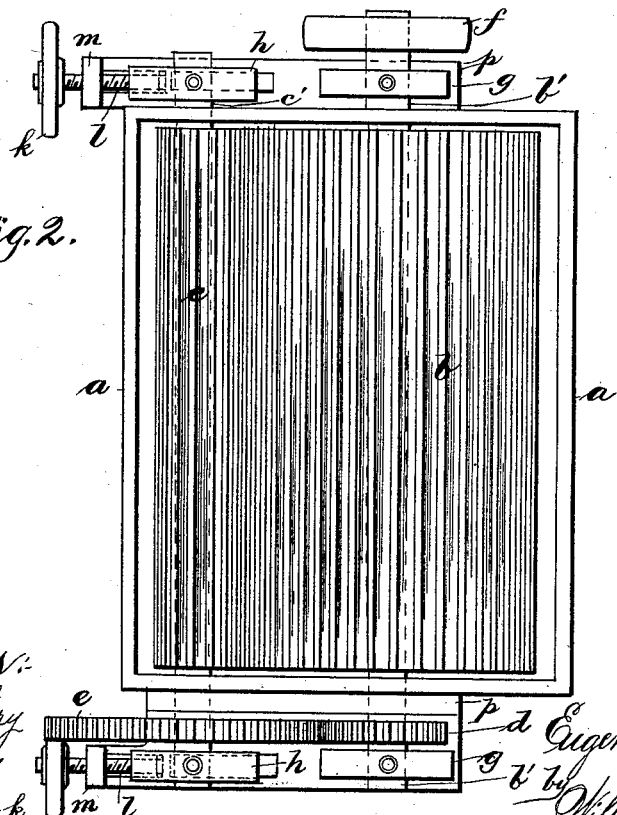

Figure 1 is a side elevation, and Fig. 2 a plan view, of the distributer.

The two fluted or grooved distributing-rollers $b$ and $c$ are fixed upon the mill-hopper $a$. Upon the shafts $b'$ and $c'$ of these rollers are secured the toothed wheels $d$ and $e$. The tooth-wheel $e$, fixed upon the shaft of the smaller distributing-roller $c$, is provided with eight times the number of teeth of the tooth-wheel $d$ on the shaft of the large distributing-roller, which receives its motion from the driving-pulley $f$, secured upon the shaft $b'$ outside of the frame which supports the different distributing parts.

The ends of the shafts $b'$ and $c'$ are supported in bearings. The bearings $g$ of the shaft $b'$ are fixed, while the bearings $h$ of the shaft $c'$ are adjustable, and can be moved upon the apparatus by operating the hand-wheel $k$, which is secured on the screw $l$ turning in the fixed nut $m$.

By rotating the hand-wheel $k$ the space between the small adjustable roller $c$ and the large distributing-roller $b$ may be increased or diminished according to the direction of such rotation, and the delivery of the distributer may thus be regulated.

It will be understood that instead of giving the wheel $e$ a number of teeth equal to eight times the number of teeth of the wheel $d$ the relative number of these teeth may be varied, as desired, so as to vary the speed of the smaller roller $c$, and thereby vary the quantity of material delivered.

I claim—

In a feed-regulator for grinding-mills, the combination, with the hopper, of shafts passing through the hopper and the sides thereof, one of said shafts being mounted in fixed bearings and the other in adjustable bearings upon the outside of the hopper, whereby the latter shaft may be adjusted toward and from the fixed shaft, grooved rollers mounted upon said shafts, the roller upon the fixed shaft being of large diameter and the roller upon the adjustable shaft of relatively small diameter, a gear-wheel mounted upon one end of the fixed shaft, and a gear-wheel of relatively large diameter mounted upon one end of the adjustable shaft and gearing with the other gear-wheel, and means for rotating one of said shafts, as and for the purpose specified.

In testimony whereof I have hereto set my hand in the presence of the subscribing witnesses.

EUGENE DECOLLOGNE.

Witnesses:
 ALBERT MAULVAULT,
 C. MOTEL,
 JOSEPH TROTÉL.